(12) United States Patent
Lee

(10) Patent No.: US 6,918,317 B2
(45) Date of Patent: Jul. 19, 2005

(54) AUTOMOBILE STEERING WHEEL AND MANUFACTURING METHOD THEREOF

(75) Inventor: Seoung-Hoon Lee, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 65 days.

(21) Appl. No.: 10/681,079

(22) Filed: Oct. 7, 2003

(65) Prior Publication Data

US 2004/0081832 A1 Apr. 29, 2004

(30) Foreign Application Priority Data

Oct. 28, 2002 (KR) .................................. 10-2002-0065876

(51) Int. Cl.⁷ .................................................. B62D 1/06
(52) U.S. Cl. .............................. 74/558; 74/552; 428/60; 428/217
(58) Field of Search .................. 428/60, 61, 64.1, 428/217; 74/552, 558

(56) References Cited

U.S. PATENT DOCUMENTS

| | | |
|---|---|---|
| 4,800,775 A | 1/1989 | Iuchi |
| 5,186,075 A | 2/1993 | Kushmaul et al. |
| 5,792,302 A | 8/1998 | Nakada et al. |
| 6,012,354 A | 1/2000 | Futschik et al. |
| 6,360,632 B1 | 3/2002 | Papandreou |
| 6,386,064 B1 | 5/2002 | Hayakawa et al. |
| 6,443,030 B1 | 9/2002 | Schuler |
| 2001/0006011 A1 | 7/2001 | Testa et al. .................. 156/182 |
| 2002/0096012 A1 | 7/2002 | Hayashi et al. ............... 74/552 |

*Primary Examiner*—Alexander S. Thomas
(74) *Attorney, Agent, or Firm*—Morgan Lewis & Bockius LLP

(57) ABSTRACT

An automobile steering wheel and method of manufacturing a steering wheel are disclosed. The steering wheel comprises a hub core connected with rods of a hub via t-shaped connectors. A cover layer includes a hard part and a soft part around the periphery of the hub core and connectors. A vinyl layer and a leather layer encompass the cover layer. A coupling protruder is formed at the front end of the hard part and extends toward the soft part. A plurality of coupling ribs are mounted on the surface of the coupling protruder.

6 Claims, 3 Drawing Sheets

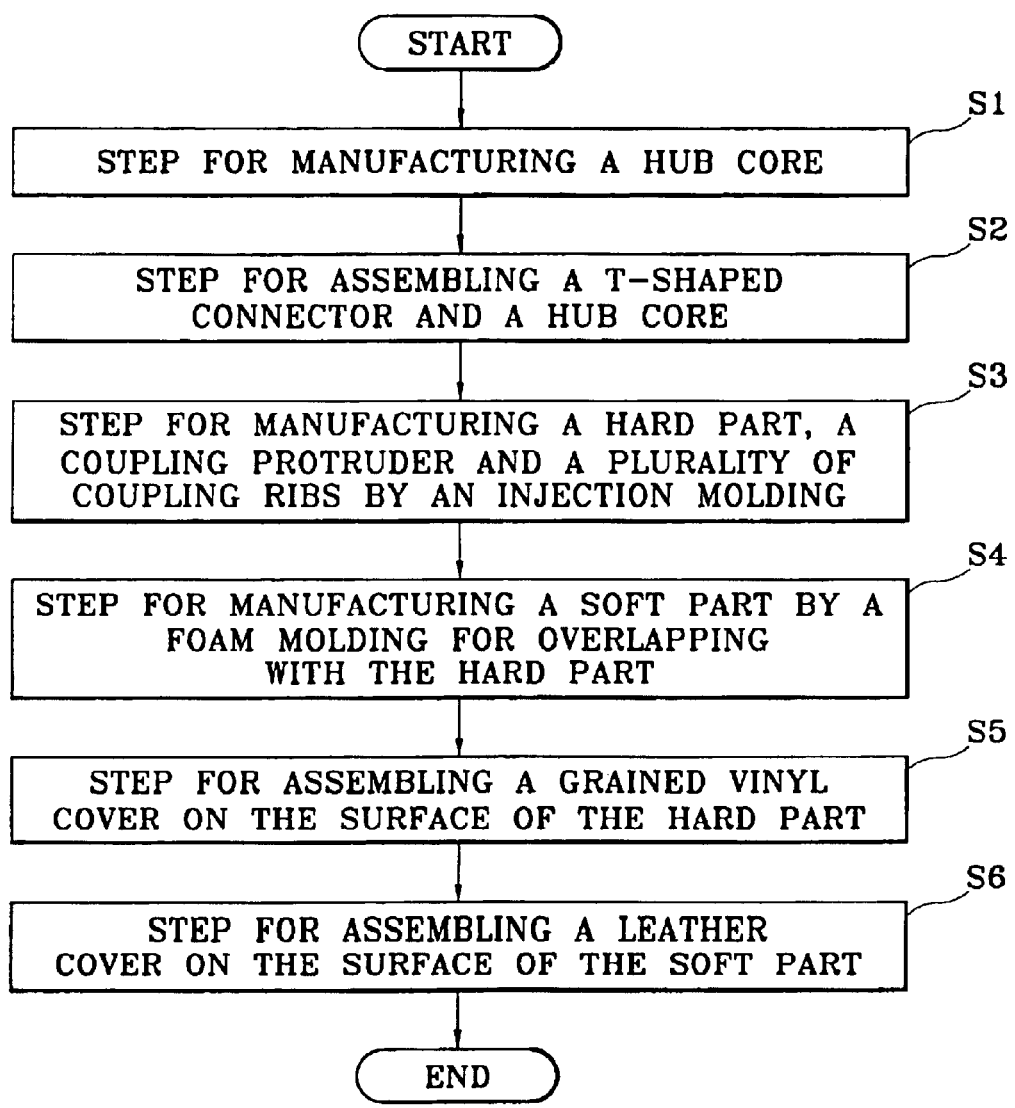

AUTOMOBILE STEERING WHEEL AND MANUFACTURING METHOD THEREOF

CROSS-REFERENCE TO RELATED APPLICATIONS

This application claims priority of Korean Application No. 2002-65876, filed on Oct. 28, 2002, the disclosure of which is incorporated fully herein by reference.

FIELD OF THE INVENTION

The present invention relates to an automobile steering wheel and a manufacturing method thereof for preventing deterioration of the grained vinyl cover and leather cover of the steering wheel at the boundary thereof.

BACKGROUND OF THE INVENTION

In a luxury steering wheel, some parts thereof are preferably covered with a grained material for a natural and elegant appearance while the residual parts are covered with leather for preventing slippage and improving the handling of the steering wheel.

When the steering wheel is covered by two different kinds of materials such as a grained vinyl cover and leather, the connecting structure and connecting method of the two materials are important for maintaining a long lasting and fine external appearance.

SUMMARY OF THE INVENTION

Embodiments of the present invention provide an automobile steering wheel and a manufacturing method thereof adapted to preliminarily prevent formation of a gap in the bordering area between the grained material and leather cover that may contract due to changes in temperature and moisture.

In one embodiment of the present invention, a steering wheel comprises a hub core of a steering wheel rim integrally connected with rods of a hub via T-shaped connectors, a cover layer including a hard part and a soft part formed around the periphery of the hub core and the T-shaped connector, and a grained vinyl cover and a leather cover for encompassing the cover layer. The steering wheel further comprises a coupling protruder formed at the frontal end of the hard part toward the soft part where the frontal end of the hard part is positioned as a boundary of the grained vinyl cover and leather cover, and a plurality of coupling ribs mounted on the surface of the coupling protruder for being engaged with the soft part and the leather cover.

In another embodiment of the present invention, a manufacturing method for a steering wheel comprises manufacturing a hub core constituting a steering wheel rim by either steel roll-molding or Magnesium (Mg) injection-molding; assembling a T-shaped connector formed by Aluminum (Al) die casting, with a hub core by welding; putting the hub core and T-shaped connector assembly into a mold for coating a cover layer thereon, where the cover layer includes a hard part and a soft part; and covering a grained vinyl cover and a leather cover on the cover layer. A preferred manufacturing method may further comprise injection-molding the hard part on a partial section of the hub core and T-shaped connector; foam-molding the soft part on the remaining part in order to overlap with the hard part; coating the grained vinyl cover on the surface of the hard part; and assembling the leather cover on the surface of the soft part for completion of the steering wheel cover.

BRIEF DESCRIPTION OF THE DRAWINGS

For fuller understanding of the nature and objects of the present invention, reference should be made to the following detailed description taken in conjunction with the accompanying drawings in which:

FIG. 4 is a schematic flowchart describing a manufacturing method of a steering wheel according to the embodiment of the present invention.

DETAILED DESCRIPTION OF THE INVENTION

Hereinafter, the preferred embodiment of the present invention will be described in detail with reference to the accompanying drawings.

Figure 1:
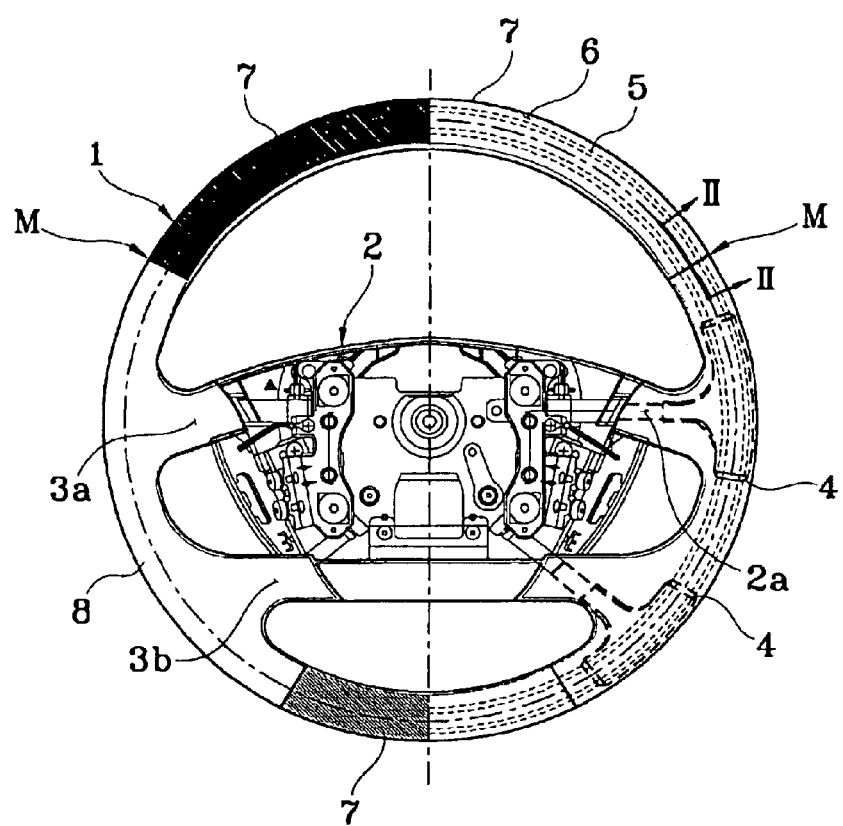
FIG. 1 illustrates a front view of a steering wheel according to an embodiment of the present invention.
Figure 2:
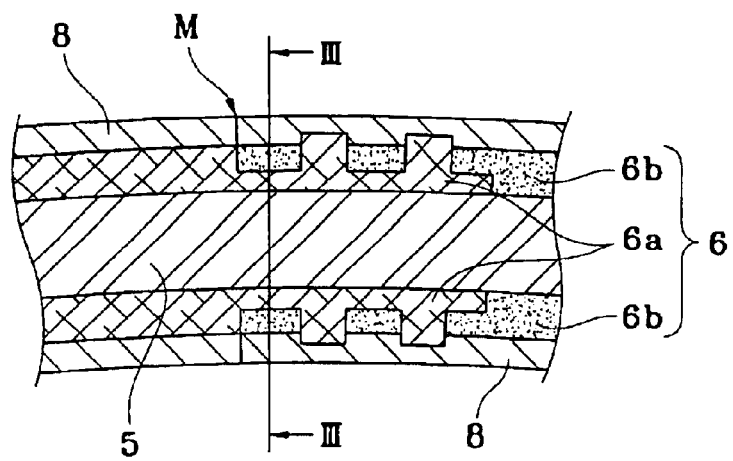
FIG. 2 is a partial sectional view taken along line II—II of FIG. 1 according to the embodiment of the present invention.
Figure 3:
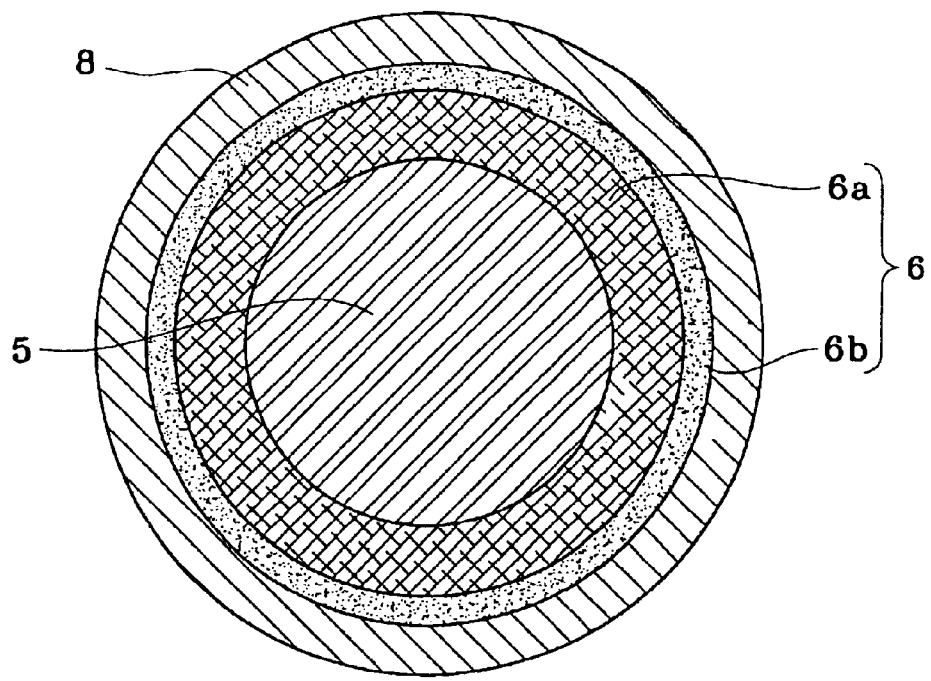
FIG. 3 is a partial sectional view taken along line III—III of FIG. 2 according to the embodiment of the present invention.

A steering wheel, as shown in FIGS. 1 to 3, includes a steering wheel rim 1 taking a shape of a ring, a hub 2 into which the front end of a steering shaft is mounted in addition to a horn and an air-bag, and an upper spoke 3a and a lower spoke 3b for connecting the hub 2 and the steering wheel rim 1.

The upper and the lower spoke 3a and 3b include a T-shaped connector 4 manufactured in Al die casting. The three end openings of the T-shaped connector 4 are respectively inserted and welded into a hub core 5 and a hub rod 2a secured at the hub 2 for an integral form of the steering wheel rim 1 and the hub 2.

Following the completion of the frame of a steering wheel, a cover layer 6 having a hard part 6a and a soft part 6b is formed thereon for a fine external look and easy operation. The hard part 6a is preferably formed by an injection molding using a glass fiber, while the soft part 6b is preferably formed by a foam molding using a Polyurethane (PU). Moreover, a grained vinyl cover 7 and a leather cover 8 are used to shroud the external surface of the cover layer 6 for a good external look and non-slippage of the steering wheel. In other words, as shown in FIG. 1, the grained vinyl cover 7 is wrapped around the upper part of the steering wheel 1 above the upper spoke 3a and around the lower part of the steering wheel 1 below the lower spoke 3b. The leather 8 is covered at the remaining portions of the steering wheel rim 1.

On the other hand, because the grained vinyl cover 7 and the leather cover 8 respectively have different contraction and expansion coefficients in response to temperature and moisture, the boundary part (M) therebetween may generate a gap when a hard contraction occurs. This drawback, however, can be overcome by extensively protruding the frontal end of the hard part 6a toward the soft part 6b and by coupling the hard part 6a protruded toward the soft part 6b with the soft part 6b and the leather cover 8.

As a result, the frontal end of the hard part 6a is formed with a coupling protruder 6a-1 projected to the soft part 6b, wherein a plurality of coupling ribs 6a-2 are formed at the surface of the coupling protruder 6a-1. The soft part 6b is coupled with the plurality of coupling ribs 6a-2 by foam molding so as to be overlapped with the hard part 6a. In addition, when the leather cover 8 embraces the soft part 6b, the plurality of coupling ribs 6a-2 are closely attached to the inner side of the leather cover 8, thereby preventing the boundary part (M) of the grained vinyl cover 7 and leather cover 8 from being widened even if contraction or expansion occurs due to the temperature and moisture.

The coupling protruder 6a-1 and the plurality of coupling ribs 6a-2 are preferably integrally formed with the hard part 6a, the hard part 6a made via injection molding. Further, coupling rib grooves 8b into which the plurality of coupling ribs 6a 2 are inserted are formed inside the leather cover 8 for increasing the connecting force of the grained vinyl cover 7 and leather cover 8.

The steering wheel is preferably configured through a process as illustrated in the flowchart in FIG. 4. A hub core 5 of the steering wheel rim 1 is manufactured by either steel roll-molding or Mg injection-molding (S1). A T-shaped connector 4 manufactured by Al die casting is assembled with a hub core 5 by welding (S2). The hub core 5 and T-shaped connector 4 assembly is put into a mold for integrally forming with a hard part 6a, a coupling protruder 6a-1, and a plurality of coupling ribs 6a-2 at a predetermined section thereon by glass fiber injection molding (S3). A soft part 6b embraces the leftover section unformed with the hard part 6a, by PU foam-molding (S4), thereby completing the exterior of the steering wheel.

A film sheet of a grained vinyl cover 7 is attached onto the surface of the hard part 6a manufactured by the glass fiber (S5). A leather cover 8 is wound by stitches around the surface of the soft part 6b manufactured by PU (S6), allowing to complete the manufacturing process of a steering wheel having the grained vinyl cover 7 and the leather cover 8.

Thus, there is an advantage in embodiments of the present invention in that a soft part 6b shrouds a coupling protruder 6a-1 and a plurality of coupling ribs 6a-2 embedded into coupling rib grooves 8b of a leather cover 8. As a result, the end of the leather cover 8 may be held by the plurality of coupling ribs 6a-2, preventing contraction between the grained vinyl cover 7 and the leather cover 8 even in varying temperature and moisture conditions.

There is another advantage in that the structure thus described prevents the boundary part (M) of the grained vinyl cover 7 and the leather cover 8 from being widened, thereby maintaining a fine look of the steering wheel.

As apparent from the foregoing, there is still another advantage in that the automobile steering wheel is integrally formed with a coupling protruder and a plurality of coupling ribs at a frontal end of a hard part as a cover layer wherein a soft part is overlapped with the coupling protruder and the plurality of coupling ribs by foam molding, enabling to prevent a gap at a boundary caused by changes in temperature and moisture between the grained vinyl cover and leather cover which respectively encompass the hard part and soft part.

What is claimed is:

1. An automobile steering wheel, the steering wheel comprising:

a hub core connected with rods of a hub via T-shaped connectors;

a cover layer including a hard part and a soft part around the periphery of said hub core and said T-shaped connector;

a vinyl cover and a leather cover encompassing said cover layer;

a coupling protruder formed at a frontal end of said hard part, extending toward said soft part where the frontal end of said hard part is positioned as a boundary of said vinyl cover and leather cover; and a plurality of coupling ribs mounted on the surface of said coupling protruder and engaged with said soft part and said leather cover.

2. The steering wheel as defined in claim 1, wherein said coupling protruder and said plurality of coupling ribs are integrally formed with said hard part.

3. The steering wheel as defined in claim 1, wherein said hard part is formed by a glass fiber while said soft part is formed by a Polyurethane (PU).

4. The steering wheel as defined in claim 1, wherein coupling rib grooves into which said plurality of coupling ribs are inserted are formed inside said leather cover.

5. A manufacturing method of a steering wheel, the method comprising the steps of:

manufacturing a hub core for forming a steering wheel rim;

assembling a T-shaped connector with a hub core by welding to the hub core;

placing said hub core and said T-shaped connector assembly into a mold for coating a cover layer thereon, wherein said cover layer includes a hard part and a soft part and coating said cover layer thereon:

covering a grained vinyl cover and a leather cover around said cover layer; injection-molding said hard part on a partial section of said hub core and T-shaped connector to leave an unmolded remaining section;

foam-molding said soft part on the remaining section in order to overlap with said hard part;

coating said grained vinyl cover on the surface of said hard part; and assembling said leather cover on the surface of said soft part for completion of said steering wheel cover.

6. The method as defined in claim 5, wherein said hard part is formed by injection molding using a glass fiber, while said soft part is formed by foam molding using Polyurethane (PU).

* * * * *